(12) United States Patent
Kagan et al.

(10) Patent No.: US 8,665,061 B2
(45) Date of Patent: Mar. 4, 2014

(54) INTELLIGENT ELECTRONIC DEVICE HAVING USER-AUTHENTICATING CAPABILITIES

(75) Inventors: Andrew Kagan, Great Neck, NY (US); Erran Kagan, Great Neck, NY (US)

(73) Assignee: Electro Industries/Gauge Tech, Westbury, NY (US)

( * ) Notice: Subject to any disclaimer, the term of this patent is extended or adjusted under 35 U.S.C. 154(b) by 663 days.

(21) Appl. No.: 12/536,035

(22) Filed: Aug. 5, 2009

(65) Prior Publication Data

US 2011/0035338 A1    Feb. 10, 2011

(51) Int. Cl.
*G08C 19/00* (2006.01)
(52) U.S. Cl.
USPC ........................................................ 340/5.52
(58) Field of Classification Search
USPC ............................. 340/5.8; 702/60, 38, 64, 66
See application file for complete search history.

(56) References Cited

U.S. PATENT DOCUMENTS

| | | | | |
|---|---|---|---|---|
| 5,525,898 A | * | 6/1996 | Lee et al. | 324/142 |
| 6,389,542 B1 | * | 5/2002 | Flyntz | 726/17 |
| 6,608,911 B2 | * | 8/2003 | Lofgren et al. | 382/100 |
| 6,735,497 B2 | * | 5/2004 | Wallace et al. | 700/231 |
| 6,944,700 B2 | * | 9/2005 | Bateman et al. | 710/300 |
| 7,043,643 B1 | * | 5/2006 | Doe et al. | 713/189 |
| 7,463,986 B2 | * | 12/2008 | Hayes | 702/62 |

* cited by examiner

*Primary Examiner* — Vernal Brown
(74) *Attorney, Agent, or Firm* — Gerald E. Hespos; Michael J. Porco; Matthew T. Hespos

(57) ABSTRACT

An intelligent electronic device (IED) includes a user authentication module configured for authenticating authorized users of the IED and preventing an access by non-authorized personnel to a user-selectable portion of operational features of the IED. In exemplary embodiments, the user authentication module includes a database of information authenticating an authorized user and a sensor acquiring user-identifying information (e.g., a biometric sensor, a reader of magnetic, holographic, RFID, or smart ID cards, or a keypad). In one application, these techniques are implemented in IEDs such as electrical power and energy meters and used to control access to reset, configuration, billing, communication, and data acquisition/processing functions of the meters.

44 Claims, 7 Drawing Sheets

INTELLIGENT ELECTRONIC DEVICE HAVING USER-AUTHENTICATING CAPABILITIES

FIELD

The present disclosure relates generally to the field of intelligent electronic devices and, in particular, to digital power and energy meters having user-authenticating capabilities.

BACKGROUND OF THE INVENTION

Utilities gradually replace traditional means for managing and controlling the consumption and quality of electrical power, water, or gas with intelligent electronic devices (IEDs). For example, IEDs used by electrical utilities include digital power and/or energy meters, digital electric power quality analyzers, electronically-controlled Remote Terminal Units, protective relays, fault recorders, and the like apparatuses.

In operation, the IEDs provide a broad range of monitoring, reporting, and billing functions, adapted for receiving/transmitting information over communication networks, and may support a plurality of user-selectable features. However, there is still a need for an IED capable of protecting a user-selectable portion of operational features thereof from an access by unauthorized personnel who, intentionally or unintentionally, may cause the IED to produce or communicate incorrect or corrupted data (for example, erroneous power, energy, or revenue readings) or damage the IED. Therefore, further improvements in the IEDs would be desirable.

SUMMARY

One aspect of the present disclosure provides an intelligent electronic device (IED) configured for authenticating an authorized user thereof and preventing an access by non-authorized personnel to a user-selectable portion of operational features of the IED.

In one embodiment, the IED such as, for example, a digital electrical power and energy meter, includes a user authentication module having a database of information authenticating authorized users of the IED and a sensor for acquiring user-identifying information. Such a sensor may be, for example, a biometric sensor (e.g., fingerprint or eye iris/retina sensor), a reader of magnetic, holographic, RFID, or smart ID cards, or a keypad.

In operation, the user authentication module allows an access to the user-selectable portion of operational features of the meter (e.g., reset, configuration, billing, communication, or data acquisition/data processing, among other features) only to positively authenticated users thereof.

According to one aspect of the present disclosure, an intelligent electronic device (IED) includes a metering module configured for measuring or calculating parameters of waveforms of voltages and currents of electrical services; a processing module configured for processing data obtained using the metering module and administering operational features of the IED; a user interface module configured for displaying data and configuration settings of the IED; and a user authentication module configured for authenticating an authorized user of the IED and preventing an access by non-authorized personnel to a user-selectable portion of the operational features, wherein the user authentication module includes a biometric sensor for acquisition of user's authenticating information.

In one aspect, IED is selected from the group consisting of an electrical power and/or energy meter, an analyzer of quality of electrical power, an electrical Remote Terminal Unit, an electrical protective relay, an electrical power fault recorder, a Programmable Logic Controller, a water meter, and a gas meter.

In another aspect, the biometric sensor is selected from a fingerprint sensor, an eye iris sensor and an eye retina sensor.

In yet another aspect of the present disclosure, the IED further includes an image capture module for capturing at least one image at a location of the IED. Furthermore, the IED includes a communication module for transmitting the at least one captured image to a location remote from the location of the IED. In one embodiment, the at least one captured image is transmitted upon detection of a tamper trigger. In another embodiment, the at least one captured image is transmitted upon failure of user authentication. The at least one captured image is transmitted via e-mail or other network communication protocols.

According to a further aspect of the present disclosure, an intelligent electronic device (IED) includes a metering module configured for measuring or calculating parameters of waveforms of voltages and currents of electrical services; a processing module configured for processing data obtained using the metering module and administering operational features of the IED; a user interface module configured for displaying data and configuration settings of the IED; and a user authentication module configured for authenticating an authorized user of the IED and preventing an access by non-authorized personnel to a user-selectable portion of the operational features, wherein the user authentication module comprises a reader of ID cards for acquisition of user's authenticating information.

The ID cards include but are not limited to magnetic ID cards, holographic ID cards, RFID cards and smart ID cards.

According to another aspect of the present disclosure, a system for authenticating a user of an intelligent electronic device (IED) is provided. The system includes at least one intelligent electronic device (IED) including: a metering module configured for measuring or calculating parameters of waveforms of voltages and currents of electrical services; a processing module configured for processing data obtained using the metering module and administering operational features of the IED; a sensor for acquiring authenticating information from at least one user; and a communication module for transmitting the at least one user's authenticating information to a remote server; and the remote server for authenticating an authorized user of the IED and preventing an access by non-authorized personnel to a user-selectable portion of the operational features by comparing the received at least one user's authenticating information to at least one record in a database coupled to the remote server.

Various aspects and embodiments of the disclosure are described in further detail below.

The Summary is neither intended nor should it be construed as being representative of the full extent and scope of the present disclosure, which these and additional aspects will become more readily apparent from the detailed description, particularly when taken together with the appended drawings.

Figure 1:
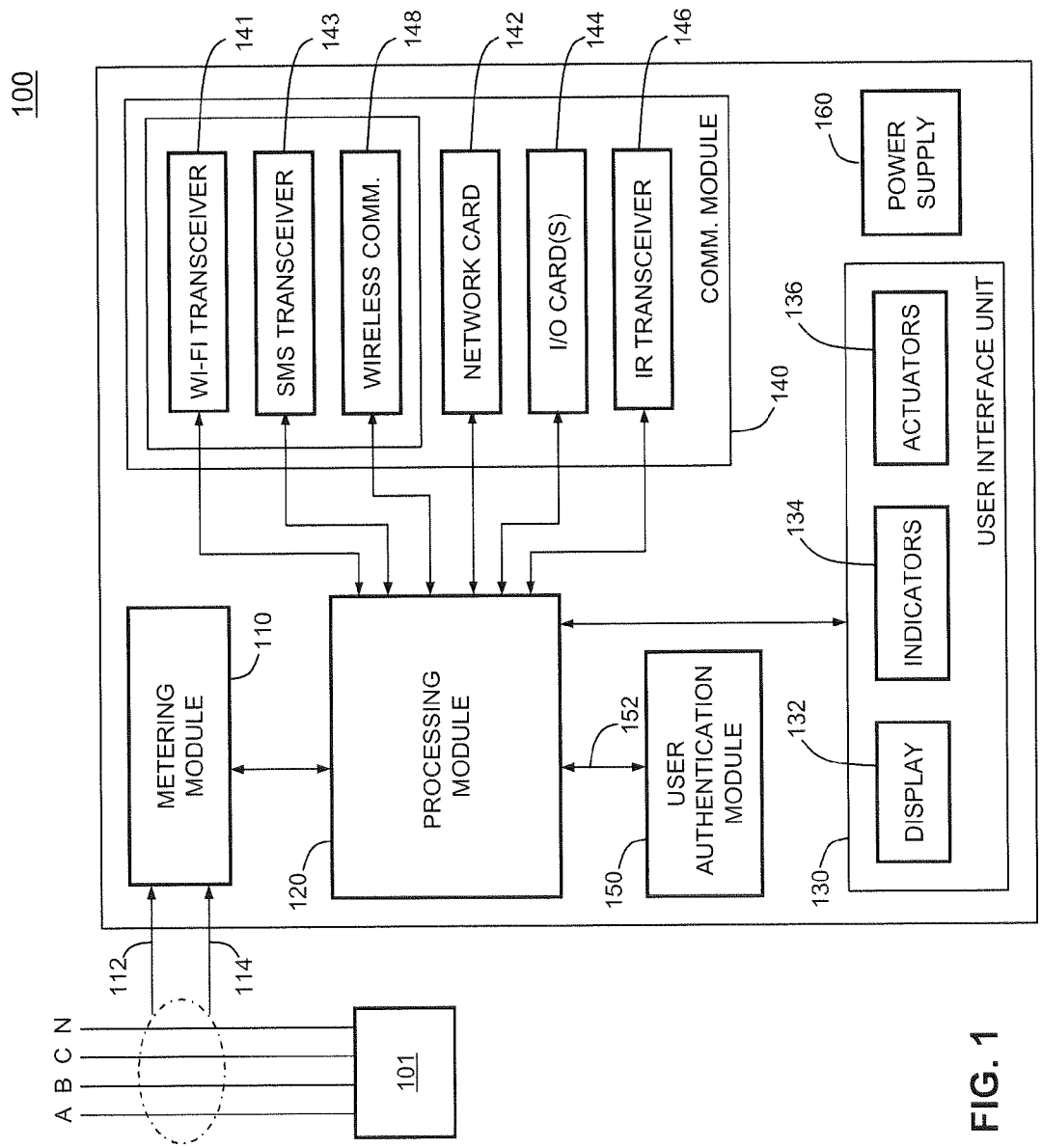
FIG. 1 depicts a schematic block diagram of an exemplary IED such as a digital power and energy meter, in accordance with one embodiment of the present disclosure.

To facilitate understanding, identical reference numerals have been used, where possible, to designate identical elements that are common to the figures, except that alphanumerical suffixes may be added, when appropriate, to differentiate such elements. The images in the drawings are simplified for illustrative purposes and are not depicted to scale.

The appended drawings illustrate exemplary embodiments of the present disclosure and, as such, should not be considered as limiting the scope of the disclosure that may admit to other equally effective embodiments. Correspondingly, it has been contemplated that features or steps of one embodiment may beneficially be incorporated in other embodiments without further recitation.

In some embodiments, particular method steps of the discussed methods are performed in the depicted order. In alternate embodiments, in the respective methods, at least two method steps or portions thereof may be performed contemporaneously, in parallel, or in a different order.

DETAILED DESCRIPTION

It should be understood that the elements shown in the figures may be implemented in various forms of hardware, software, or combinations thereof. Preferably, these elements are implemented in a combination of hardware and software on one or more appropriately programmed general-purpose devices, which may include a processor, a memory and input/output interfaces.

The present description illustrates the principles of the present disclosure. It will thus be appreciated that those skilled in the art will be able to devise various arrangements that, although may not be explicitly described or shown herein, embody the principles of the disclosure and are included within its spirit and scope.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure thereof.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudo-code, and the like represent various processes which may be substantially represented in computer readable media and so executed by a computer or processor, whether or not such a computer or a processor is explicitly shown.

The functions of the various elements shown in the figures may be provided through the use of dedicated hardware, as well as hardware capable of executing software in association with the appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, a read only memory ("ROM") for storing software, a random access memory ("RAM"), and nonvolatile storage devices.

Other hardware, conventional and/or custom, may also be included. Similarly, any switches shown in the figures are conceptual only. Their function may be carried out through the operation of a programmable logic, a dedicated logic, interaction of the programmable and dedicated logic, or manually, where the particular technique being selectable by the implementer as more specifically understood from the context.

Aspects of the present disclosure are illustratively described herein within the context of intelligent electronic devices ("IEDs"), such as digital electrical power and energy meters, including revenue accuracy-certifiable meters. The term a "digital electrical power and energy meter" is broadly used herein in reference to an IED adapted to measure, record, and communicate at least some of power, energy, revenue, values and other properties of supply currents/voltages, their harmonics, transients, and other related data.

It will be appreciated by those skilled in the art that the disclosure may also be utilized within the context of other IEDs, including Programmable Logic Controllers, Remote Terminal Units, protective relays, fault recorders, gas meters, and water meters, among other devices or systems used to manage and control quality, distribution, and consumption of electrical power, gas, or water.

The word "exemplary" is used herein to mean "serving as an example, instance, or illustration." Any configuration or design described herein as "exemplary" is not necessarily to be construed as preferred or advantageous over other configurations or designs. Herein, the phrase "coupled with" is defined to mean directly connected to or indirectly connected with through one or more intermediate components that may include both hardware and software components.

FIG. 1 depicts a schematic diagram illustrating an exemplary digital electrical power and energy meter 100 (referred to hereafter as "meter") monitoring loads of one or more electrical services 101. The meter 100 generally comprises a metering module 110, a processing module 120, a user interface unit 130, a communications module 140, a user authentication module (UAM) 150, and a power supply 160. Communications between components of the meter 100 may be performed using serial and parallel interfaces, e.g., DNP, Modbus, Serial Peripheral Interface (SPI), RS-232, RS-485, Universal Serial Bus (USB), and Firewire (IEEE-1394), as well as other data-transmission interfaces.

Illustratively, power lines of an exemplary electrical service 101 include phase lines A, B, and C and a neutral line N, which are coupled to the meter 100 using voltage interface 112 and current interface 114. Methods of coupling digital electrical power and energy meters to various electrical services are described, e.g., in commonly assigned U.S. Pat. No. 7,271,996, the contents of which are hereby incorporated by reference in its entirety. In specific embodiments, the electrical services 101 may have single-phase, dual-phase, Wye, Delta, and multi-phase wiring configurations or include DC wiring. The power supply 160 may be coupled to power lines of the electrical service 101 or, alternatively, to an independent source of power.

The metering module 110 is adapted to process signals corresponding to waveforms of the supply voltages and currents of the electrical service 101, which are provided to the module 110 via the interfaces 112 and 1 14. In one embodiment, the metering module 110 comprises (not shown) pluralities of voltage dividers, current sensors, voltage sensors and voltage/current gain control circuits, a data acquisition system including a plurality of analog-to-digital converters (ADCs), and a metering processor. The sensors will sense electrical parameters, e.g., voltage and current, of the incoming lines from an electrical power distribution system. Preferably, the sensors will include current transformers and potential transformers, wherein one current transformer and one voltage transformer will be coupled to each phase of the incoming power lines, e.g., lines A,B,C, N as shown in FIG. 1. A primary winding of each transformer will be coupled to the incoming power lines and a secondary winding of each transformer will output a voltage representative of the sensed voltage and current. The output of each transformer will be coupled to the analog-to-digital converters (ADCs) configured to convert the analog output voltage from the transformer to a digital signal that can be processed by the processing module 120.

The processing module 120 is adapted for processing data of the metering module 110 and other functional elements of the meter 100 and for administering operational features of the meter. The processing module 120 generally comprises (not shown) a central processor, a digital signal processing (DSP) unit, interface modules and controllers (for example, controllers of the metering module 110, user interface unit 130, and communications module 140), a memory module including random access memory (RAM), flash memory, and an electrically erasable programmable read-only memory (EEPROM) devices, a real-time clock, support circuits, and an optional power backup (for example, replaceable battery).

The user interface unit 130 generally includes a front panel display 132 (e.g., liquid crystal display (LCD) or plasma display), indicators 134 (for example, LED indicators), and actuators, or user controls, 136. The actuators 136 include pushbuttons, switches and selectors that allow to select/ modify configuration settings of the meter 100, request particular data for being shown on the display 132, or review data and messages produced by the meter. In one embodiment, the user interface unit 130 includes a touch-screen display 132, which may also be used to review the status messages of the meter 100 The display 132 may provide the information to the user in the form of alpha-numeric lines, computer-generated graphics, videos, animations, etc. The user interface unit 130 may also include a speaker or audible output means for audibly producing instructions, alarms, data, etc. An exemplary interface is disclosed and described in commonly owned co-pending U.S. application Ser. No. 11/589,381, entitled "POWER METER HAVING AUDIBLE AND VISUAL INTERFACE", which claims priority to U.S. Provisional Patent Appl. No. 60/731,006, filed Oct. 28, 2005, the contents of which are hereby incorporated by reference in their entireties.

In the depicted embodiment, the communications module 140 illustratively comprises a Wi-Fi transceiver 141, a Short Messaging Service (SMS) transceiver 143, a network communication device 142 (e.g., network interface card (NIC)), digital and analog input/output (I/O) card(s) 144, an infrared (IR) transceiver 146, and a wireless communication device 148. Using the communications module 140, the meter 100 may be connected to wired and wireless communication networks (not shown) using existing and/or dedicated wired, wireless, or optical interfaces, transmit and receive data, instructions, and information using industry-standard communication protocols, as well as perform real-time conversions between such protocols.

Generally, the meter 100 is operable to monitor, calculate, and analyze at least some of real, reactive and total power, power factors, energy and/or revenue, line/phase voltages and currents or root mean square (RMS) values thereof, voltage/ current total harmonic distortion (THD), voltage/current transient events and sub-cycle transient events, among other parameters of particular electrical services 101. Additionally or alternatively, the meter 100 may be configured to detect voltage/current fault signatures, voltage surges, sags and flickers, neutral-to-ground voltage fluctuations, voltage/current harmonics and interharmonics. The meter 100 may also perform automatic accuracy calibrations and temperature compensations and be programmed (i.e., configured) for time stamping of collected data, accumulating the data during pre-scheduled time intervals or per an event-triggered schedule, and for reporting data and billing information with pre-scheduled periodicity, as well as be programmed for storing, displaying, or transmitting pre-event and post-event portions of waveforms of monitored voltages and currents of the electrical services 101.

Using the user interface unit 130, at least some of these features of the meter 100 may be accessed and reviewed or modified by users thereof (for example, owners/operators of loads monitored by the meter 100, service personnel of electrical service 101, officials, inspectors, etc.). Herein, such user-accessible features are broadly referred to as a "user-selectable portion of operational features" of the meter 100.

In one embodiment, the users of the meter 100 may access such features of the meter via the user interface unit 130. For example, by using the actuators 136 of the user interface unit 130, the user may enable, disable, or perform programming/ re-programming of at least some of reset, configuration, billing, communication, data acquisition, and data processing functions of the meter 100.

An unauthorized access to the user-selectable portion of operational features of a digital electrical power and energy meter may cause the meter to produce incorrect or corrupted data (for example, report erroneous power, energy, or revenue readings) and is prevented by the UAM 150 that is discussed in detail below in reference to FIGS. 2-7.

In operation, in the meter 100, an access to the user-selectable portion of operational features is normally disabled. Prior to obtaining an access to such features of the meter, a user is required to undergo an authentication procedure, which is administered by the UAM 150. Only a user positively authenticated by the UAM 150 as an authorized user of the meter 100 may be allowed to access the user-selectable portion of operational features of the meter.

Figure 2:
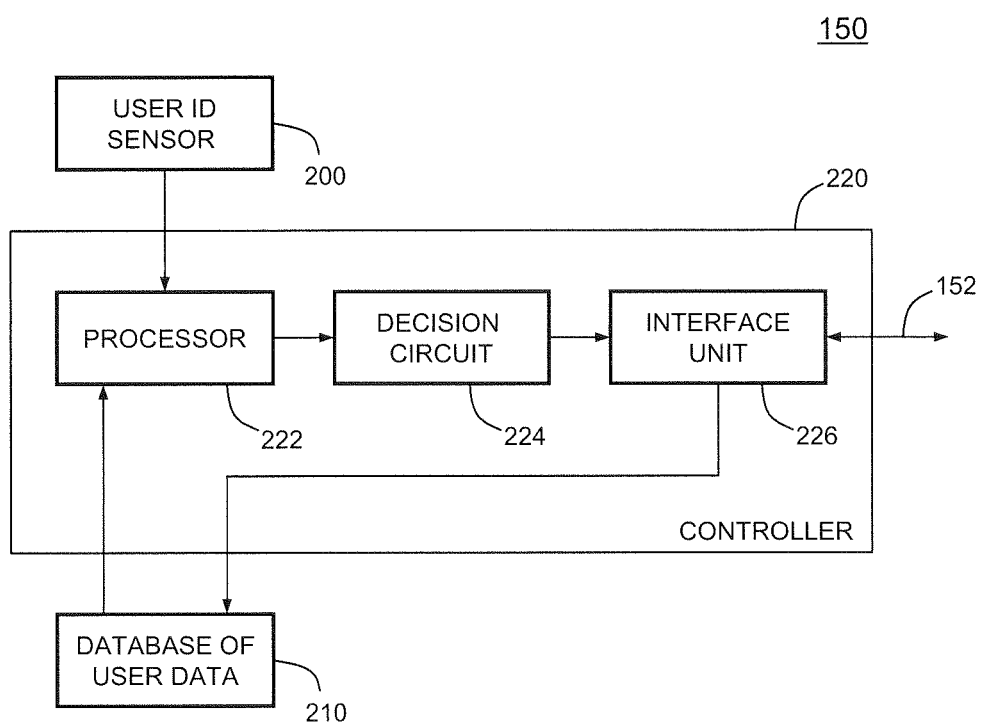
FIG. 2 depicts a high-level block diagram of a user authentication module of the digital power and energy meter of FIG. 1 in accordance with one embodiment of the present disclosure.

The UAM 150 comprises a means configured for acquisition and verification of user's authentication information. Referring to FIG. 2, in one embodiment, the UAM 150 generally includes a user ID sensor 200, a database 210 of information positively identifying authorized users of the meter 100, and a controller 220 and is coupled to the processing module 120 using digital interface 152. Instructions for users taking an authentication test may be posted on a front panel of the meter 100 or listed in an operational manual thereof.

The user ID sensor 200 allows the user to present credentials authenticating him/herself as an authorized user of the meter 100 and generally is disposed on a front panel 800 (shown in FIG. 8) of the meter. In operation, the user ID sensor 200 acquires user's authentication information and forwards the information to the controller 220. Herein, the term "authentication information" refers to one or more of user's biometric information, as well as principal ID information, either entered by the user or embedded in user's ID cards.

Acquisition of user-authenticating information and interfacing with physical carriers of user's credentials (e.g., acquisition of patterns of user's fingerprints or eye iris/retina, accessing data embedded in user's ID cards, etc.) are performed in the UAM 150 by the user ID sensor 200 using one or more techniques for proximate and remote data acquisitions.

In one embodiment, the controller 220 includes a processor 222 of the user's information acquired by the user ID sensor 200 (e.g., test patterns, passwords, or similar user-identifying data), a decision circuit 224, and an interface unit 226. In alternate embodiments (not shown), the decision circuit 224 may be a portion of the processor 222 or at least one of the processor 222, decision circuit 224, and database 210 may be a portion of the processing module 120.

In operation, to gain access to the user-selectable portion of operational features of the meter 100, a user needs to be positively identified by the UAM 150, which acquires and processes the authentication information of the user. In particular, the processor 222 compares an acquired (by the user ID sensor 200) user's authentication information (for example, fingerprint or eye iris/retina test pattern, etc.) with exemplary (i.e., known or certified) patterns of the authorized users stored in the database 210. Such exemplary patterns may be collected in advance, provided to the meter 100 using the communication module 140, and then stored in the database 210.

A user providing a test pattern that matches one of the exemplary patterns stored in the database 210 is positively authenticated as an authorized user on the meter 100. In one embodiment, a signal (or message) that the user is identified as the authorized user is generated by the decision circuit 224 and communicated by the UAM 150 to the processing module 120 using the interface unit 226.

In response, the processing module 120 enables, for duration of a pre-determined time interval, an access to the user-selectable portion of operational features of the meter 100. For example, the processing module 120 may temporarily enable the actuators 136 and/or touch-screen display 132 of the meter 100. Upon expiration of such a time interval, these features of the meter 100 are disabled until another (or the same) user is positively authenticated (re-authenticated) by the UAM 150.

When the user provides a test pattern that does not match any of the exemplary patterns stored in the database 210, such a user is identified as an unauthorized user of the meter 100. In this case, the UAM 150 produces a signal(s) (or a message) that causes the processing module 120 to keep an access to the user-selectable portion of operational features of the meter 100 disabled (for example, to keep the actuators 136 and/or touch-screen display 132 disabled).

In an alternate embodiment, the UAM 150 may directly control the access to the user-selectable portion of operational features of the meter 100 by, for example, enabling or disabling the actuators 136 and/or touch-screen display 132.

In a further embodiment, the UAM 150 or processing module 120 may store time-stamped records of attempts to obtain access to the operational features of the meter 100, IDs of the authorized users requested the access, and records of actions performed by the authorized users.

In another alternate embodiment, the processing module 120 may discriminately enable only the operational features that, based on the records contained in the database 210, a particular authorized user is granted rights to use. This embodiment corresponds to situations when authorized users may have different levels of authority in accessing some operational features of the meter 100. For example, some users may not have the authority to reset energy/revenue counters or modify configuration settings of the meter.

Figure 3:
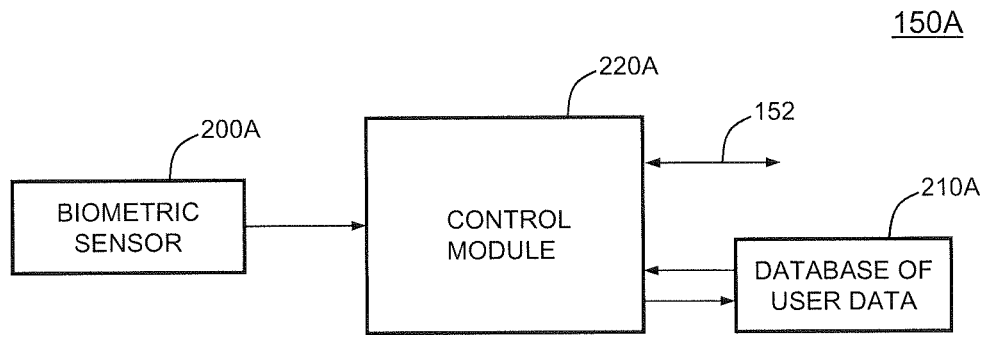
FIG. 3 depicts a high-level block diagram of the user authentication module of FIG. 2 having a biometric sensor.

Referring to FIG. 3, in one embodiment, the UAM 150A comprises a biometric sensor 200A (for example, a fingerprint sensor, an eye iris or retina sensor, and the like), a database 210A of biometric patterns selectively identifying authorized users of the meter 100, and a controller 220A. During a user authentication procedure, a user's test pattern obtained by the biometric sensor 200A is compared with biometric patterns of the authorized users the stored in the database 210A.

Figure 4:
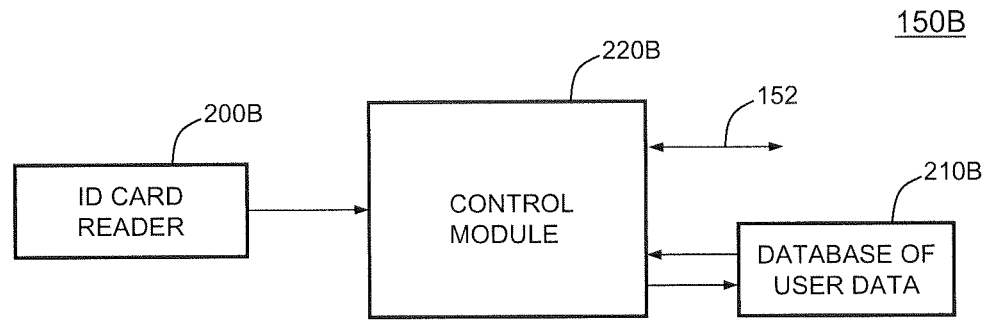
FIG. 4 depicts a high-level block diagram of the user authentication module of FIG. 2 having a card reader.

Referring to FIG. 4, in another embodiment, the UAM 150B comprises a card reader 200B of a user's ID card (for example, reader of magnetic, holographic, etc. ID cards), a database 210B of records selectively identifying authorized users of the meter 100, and a controller 220B. The card reader 200B may a slotted, proximity, or contactless card reader. During a user authentication procedure, the user's data obtained by the card reader 200B from the user's ID card is compared with the records stored in the database 210B.

Figure 5:
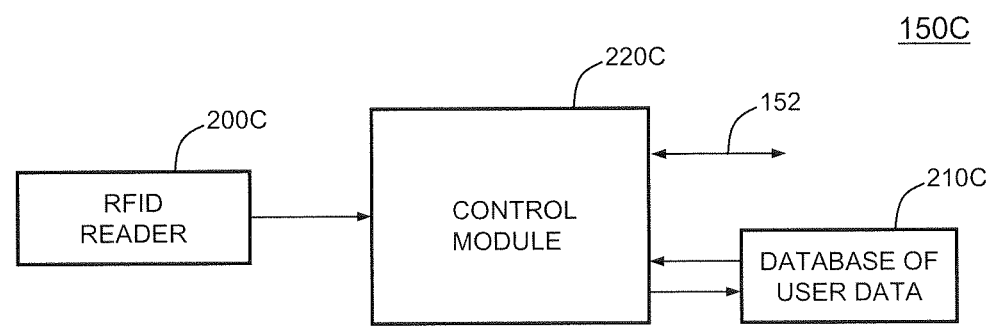
FIG. 5 depicts a high-level block diagram of the user authentication module of FIG. 2 having an RFID (radio-frequency identification) reader.

Referring to FIG. 5, in yet another embodiment, the UAM 150C comprises an RFID (radio-frequency identification) reader 200C, a database 210C of records selectively identifying authorized users of the meter 100, and a controller 220C. During a user authentication procedure, data obtained by the RFID reader 200C from the user's RFID card is compared with the records stored in the database 210C.

Figure 6:
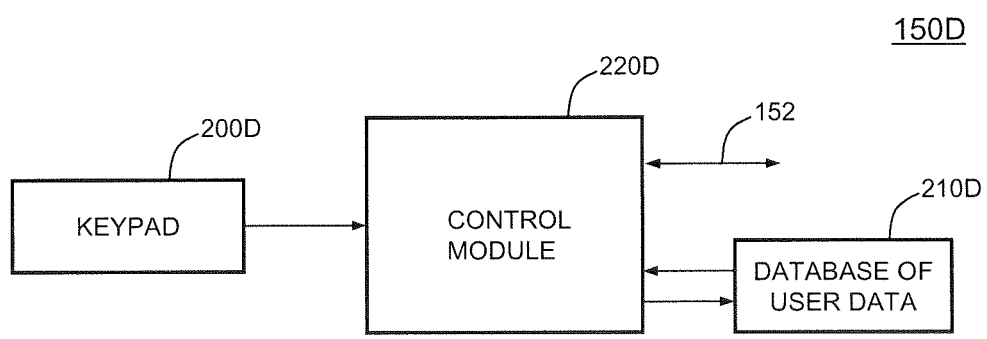
FIG. 6 depicts a high-level block diagram of the user authentication module of FIG. 2 having an alphanumerical keypad.

Referring to FIG. 6, in still another embodiment, the UAM 150D comprises a keypad 200D (for example, alphanumerical keypad), a database 210D of passwords selectively assigned to and identifying authorized users of the meter 100, and a controller 220D. During a user authentication procedure, a password entered by the user using the keypad 200D is compared with the records stored in the database 210D. In an alternate embodiment, the keypad 200D may be displayed on the touch-screen display 132.

Figure 7:
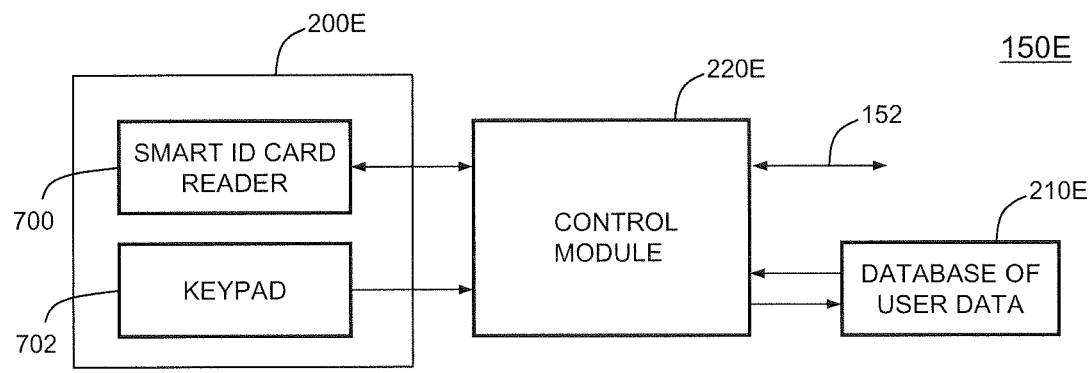
FIG. 7 depicts a high-level block diagram of the user authentication module of FIG. 2 having a smart card reader.

Referring to FIG. 7, in a further embodiment, the UAM 150E comprises a user ID sensor 200E including a reader 700 of smart ID cards and an optional alphanumerical keypad 702, a database 210E storing pre-assigned and dynamically generated passwords selectively identifying authorized users of the meter 100, and a controller 220E. Herein, the term "smart ID card" broadly refers to any pocket-sized card with embedded integrated circuits that can process data, including, e.g., cryptographic and contactless smart cards. In one embodiment, during a user authentication procedure, authentication data of the user is acquired from a user's smart ID card by the reader 700 and compared with the records stored in the database 210E. In alternate embodiments, to complete the authentication procedure, the UAM 150E generates dynamic (i.e., used only once) passwords, which may be entered using the keypad 200E, touch-screen display 132, or a dedicated touch-screen keypad.

It is to be appreciated that any of the described embodiments may require a second piece of user-identifying information to authenticate the user. For example, in one embodiment, the first piece of user-identifying information is acquired by a biometric sensor and then the user will be prompted to enter a second piece of user-identifying information, e.g., a password via the user interface unit 130. In certain embodiments, the user will only be granted access after both the first and second pieces of user-identifying information have been verified.

Figure 8:
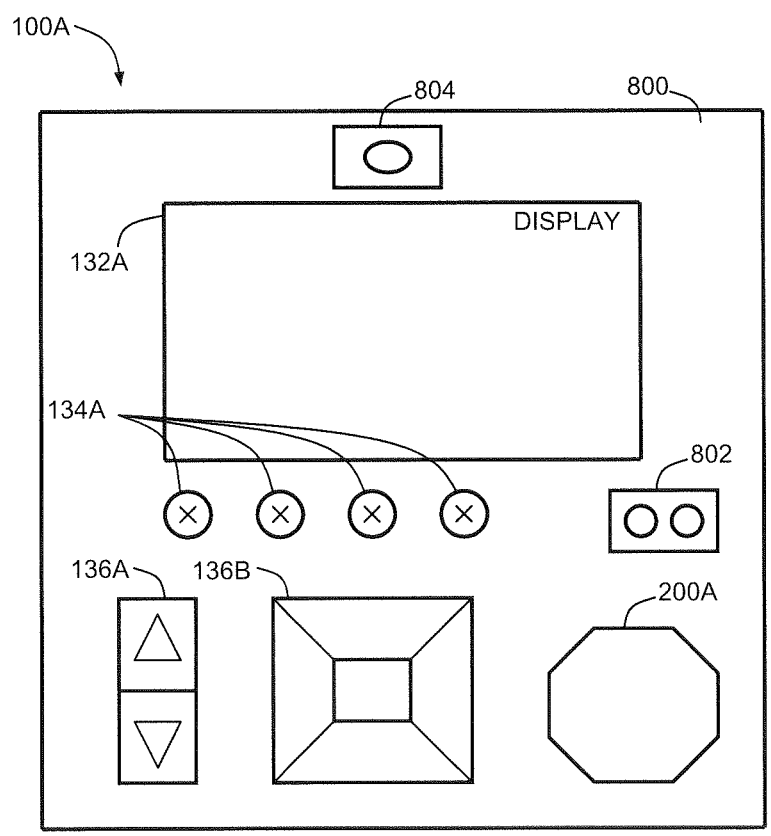
FIG. 8 depicts an exemplary schematic view of a front panel of the digital power and energy meter of FIG. 1, in accordance with one embodiment of the present disclosure.

Referring to FIG. 8, in one exemplary embodiment, a meter 100A has a front panel 800 including an alphanumerical touch-screen display 132A, a plurality of LED indicators 134A, user controls (i.e., actuators) including a decision/navigation module 136A and a function selector 136B, and optical components 802 of the IR transceiver 146. The decision/navigation module 136A and function selector 136B allow an authorized user to access a user-selectable portion of operational features of the meter. In one embodiment, such features of the meter 100A include resetting/updating energy and revenue counters, generating, reviewing, or adjusting bills for the energy consumed by loads monitored by the meter 100A (for example, entering or modifying billing rates, discounts, fees, payment schedules, etc.), as well as modifying configuration settings of the meter.

In the depicted embodiment, the meter 100A illustratively comprises the UAM 150A including the fingerprint sensor 200A. For obtaining access to the user-selectable portion of operational features of the meter, a user should allow the sensor 200A to acquire a pattern of his/her fingerprint. Only the user providing a test pattern that matches one of the exemplary patterns of the authorized users stored in the database 210A (discussed in reference to FIG. 3 above) is recognized by the UAM 150A as an authorized user of the meter 100A and allowed to access the user-selectable portion of operational features of the meter. In alternate embodiments, the meter 100A may comprise the user ID sensors 200B-200E and/or non-touch-screen displays 132A.

Figure 9:
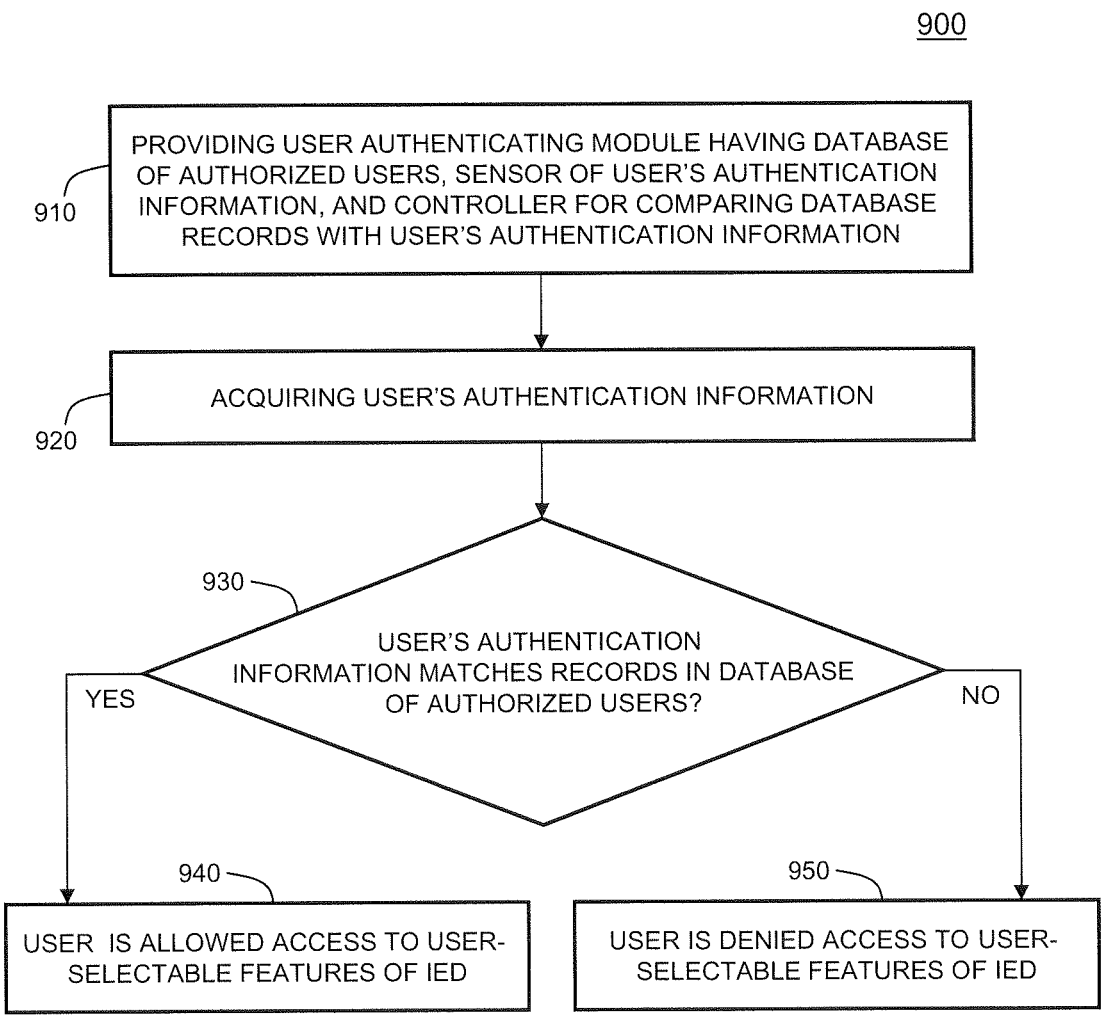
FIG. 9 depicts a flow chart illustrating a method of operating the IED such as a digital power and energy meter of FIG. 1, in accordance with one embodiment of the present disclosure.

FIG. 9 depicts a high-level flow diagram of a method 900 for operating an IED in accordance with one embodiment of the present disclosure.

At step 910, the IED is provided with a user authentication module (UAM) having (i) a memory device containing a database of information authenticating authorized users, (ii) a sensing means configured for authenticating an authorized user of the IED, and (iii) a controller configured for comparing user's records contained in the database with user's authentication information acquired by the sensing means.

In one embodiment, the IED is the meter 100 discussed above in reference to FIG. 1, and the sensing means may include a biometric sensor, a reader of magnetic, RFID, holographic, or smart ID cards, a touch-screen display, or a keypad, as discussed above in reference to FIGS. 2-7. Operational features of the meter 100 generally include pre-programmed settings, settings provided to the meter 100 via the communication module 140, and user-selectable features accessible via components of the user interface unit 130. In operation, an access to a user-selectable portion of operational features of the meter 100 is normally disabled (for example, actuators 136 are disabled).

At step 920, a user requesting an access to the user-selectable portion of operational features of the IED (e.g., meter 100) is requested to present and/or enter, using the sensing means of the IED, user's authenticating information. For example, the user may be instructed to undergo a fingerprint examination using a fingerprint sensor or an eye examination using an iris/retina sensor (such sensors are discussed above in reference to FIGS. 3).

At step 930, the UAM (e.g., UAM 150 shown in FIGS. 1-2) compares results of the user's examination performed during the preceding step 920 with records contained in the database of information authenticating the authorized users of the IED. In one embodiment, in the meter 100, the examination is performed using the processor 222 and decision circuit 224 of the controller 220.

If the results of the user's examination match one the records for the authorized users, the user who underwent the examination is positively authenticated as an authorized user of the IED, and the method 900 proceeds to step 940, where such a user is allowed to access the user-selectable portion of operational features of the IED.

In one embodiment, the UAM enables, for duration of a pre-determined time interval, respective components of the user interface unit 130. In a further embodiment, the UAM discriminately enables only the operational features that the particular authorized user is granted rights to use (for example, based on the records contained in the database of the UAM).

If, however, the results of the user's examination do match the records for the authorized users of the IED, in step 930, the method 900 proceeds to step 950, where such a user is denied an access the user-selectable portion of the operational features of the IED.

Figure 10:
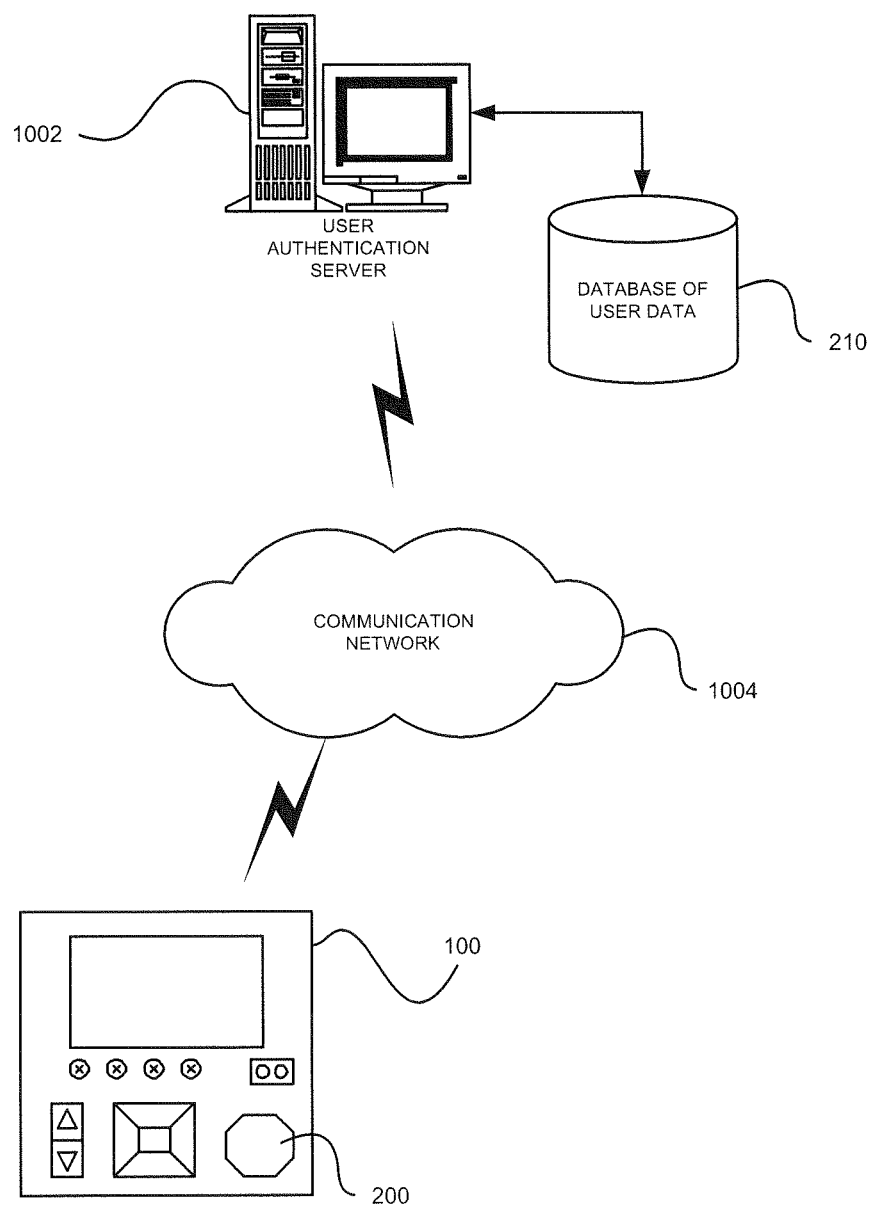
FIG. 10 depicts an exemplary system for authenticating a user remotely over a network in accordance with the present disclosure.

In another exemplary embodiment, a user is authenticated remotely away from the meter, for example, at a remote server. Referring to FIG. 10, a meter 100 is in communication with a user authentication server 1002. In this embodiment, the database of user data 210 is coupled to the user authentication server 1002 and the server 1002 interacts with the database 210 to authenticate users remotely. The meter 100 may communicate to the server 1002 or other computing device via the communications module 140 over communication network 1004. The meter 100 may be connected to the communication network 1004, e.g., the Internet, by any known means, for example, a hardwired or wireless connection. The hardwire connection may include but is not limited to hard wire cabling e.g., parallel or serial cables, RS232, RS485, USB cable, Firewire (1394 connectivity) cables, Ethernet, Fiber Optic, Fiber Optic over Ethernet, and the appropriate communication port configuration. The wireless connection will operate under any of the various known wireless protocols including but not limited to Bluetooth™ interconnectivity, infrared connectivity, radio transmission connectivity including computer digital signal broadcasting and reception commonly referred to as Wi-Fi or 802.11.X (where x denotes the type of transmission), satellite transmission or any other type of communication protocols, communication architecture or systems currently existing or to be developed for wirelessly transmitting data including spread spectrum 900 MHz, or other frequencies, Zigbee, WiFi, or any mesh enabled wireless communication.

It is to be appreciated that the communication network 1004 may be a local area network (LAN), wide area network (WAN), the Internet or any known network that couples computers to enable various modes of communication via network messages. Furthermore, the server 1002 will communicate using the various known protocols such as Transmission Control Protocol/Internet Protocol (TCP/IP), File Transfer Protocol (FTP), Hypertext Transfer Protocol (HTTP), etc. and secure protocols such as Internet Protocol Security Protocol (IPSec), Point-to-Point Tunneling Protocol (PPTP), Secure Sockets Layer (SSL) Protocol, etc.

In this embodiment, the meter 100 acquires the user's authentication information, as described above, and transmits the user's authentication information to the user authentication server 1002. It is to be appreciated that any of the above-described methods for acquiring the user's authentication information, for example those shown in FIGS. 2-7, are applicable to this embodiment. The user authentication server 1002 compares the acquired user authentication information with records contained in the database 210. If the acquired user information matches one of the records stored in the database 210, the user authentication server 1002 transmits an access signal to the meter 100 and the user is allowed to access the user-selectable portion of operational features of the IED. Otherwise, the user authentication server 1002 transmits a deny signal and the user is denied access to the IED.

In this embodiment, only one central database of user data 210 is to be maintained. The database of user data 210 could be applicable to thousands of meters under one authority's control, e.g., a utility. This avoids the need to program each meter with the proper authentication information and a database. At the central database 210, different levels of security can be assigned to each user and the managing authority can add or subtract security levels easily in already installed IEDs at the same time. Furthermore, as users leave an organization, their access can be easily revoked at the central database which will subsequently effect their access at each IED. Therefore, any time a change needs to be programmed for a particular user only the record for the user at the central database needs to be revised and no reprogramming needs to be performed at any IED or meter.

Additionally, by having the user authentication server 1002 receive the user information upon a request for access to the IED, user authentication server 1002 may employ this information for tracking data. When a user requests access at an IED, the IED transmits the user authentication information to the server 1004. The user authentication information includes but is not limited to information identifying the user (e.g., name, employee number, etc.), information identifying the IED (e.g., location information, serial number, product number, etc.), time and date when the request for access was made, etc. This information can be employed for tracking user or employee movements and/or performance. The IED may also transmit a signal when the user logs off or after a predetermined period of inactivity to indicate the user at the IED has left the location of the IED or has finished a task at the IED. Again, this information can be used to measure employee performance or for estimating time for similar tasks in the future.

In a further embodiment, the IED includes an image capture module 804 for capturing images near the IED. Referring back to FIG. 8, the image capture module 804, e.g., a charge-coupled device (CCD), complimentary metal-oxide semiconductor (CMOS), etc., is disposed on the front panel 800 of meter 100A. The digital file format utilized to capture the image is not critical, but may include standard file formats which currently exist or will exist in the future for example jpeg, tiff, bmp, gif, pcx, png or other file formats. If multiple images are captured, the images may be captured in various video formats which currently exist including Divx, Mpeg-2, Mpeg-3, Mpeg-4, Mpeg-5, Quicktime, or other video formats. The image capture module 804 will take a picture of the user who is trying to access the IED and store the image as a record of the physical appearance of the user. In one embodiment, the captured image will be transmitted to the user authentication server 1002 with the user authentication information upon request for access to the IED. The image may be used in conjunction with an image matching algorithm or program to confirm the user's identity at the server 1002. Additionally, the captured image may be used for tracking purposes to confirm the identity of the user performing a particular task as the IED or to confirm the user assigned to the particular task is performing the task and not someone else using the user's credentials.

In another embodiment, the image capture module 804 is controllable from a remote location, e.g., the user authentication server 1002 or another location. In this embodiment, a remote user will access the IED (e.g., via a web browser) and image capture module 804 to view live images of the area surrounding the IED for security purposes. The images will be provided to the remote user on demand as requested by the remote user, in response to a communication initiated at the IED, etc.

In yet another embodiment, the image capture module 804 is employed to capture an image of a person tampering with the IED. A tamper condition at the IED may be triggered under various conditions including but not limited to if the IED is physically tampered with, a user authentication fails, etc. Upon a tamper condition being triggered, the image capture module 804 will capture an image of the person at the IED and transmit the image along with other information, such as the location of the IED, date, time, etc., to the server 1002 or a proper authority such as the utility, security department of where the IED is located, the police, etc. It is to be appreciated that this communication may be sent directly to the proper authority without going through the server 1002 or may be simultaneously sent to various locations such as those described above. The communication of the tamper trigger and image may be by any communication protocol including e-mail, wherein the image, i.e., photo of person, along with the necessary data, e.g., location of IED, is formatted in a single e-mail to the appropriate remote user.

Although the disclosure herein has been described with reference to particular illustrative embodiments, it is to be understood that these embodiments are merely illustrative of the principles and applications of the present disclosure. Therefore numerous modifications may be made to the illustrative embodiments and other arrangements may be devised without departing from the spirit and scope of the present disclosure, which is defined by the appended claims.

Furthermore, although the foregoing text sets forth a detailed description of numerous embodiments, it should be understood that the legal scope of the invention is defined by the words of the claims set forth at the end of this disclosure. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than in the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

What is claimed is:

1. An intelligent electronic device (IED), comprising:
   a metering module configured for measuring or calculating parameters of waveforms of voltages and currents of an electrical power distribution system;
   a processing module configured for processing data obtained using the metering module and administering operational features of the IED;
   a user interface module configured for displaying data and configuration settings of the IED; and
   a user authentication module configured for authenticating an authorized user of the IED and preventing an access by non-authorized personnel to a portion of the operational features of the IED, wherein the user authentication module includes a biometric sensor disposed on a front panel of the IED, the biometric sensor configured to acquire a first piece of user authenticating information, and wherein the user authentication module further includes a keypad or a touch-screen display disposed on the front panel of the IED, the keypad or touch-screen display configured to acquire a second piece of user authenticating information;
   wherein the user authentication module grants the authorized user access to the portion of the operational features of the IED after the first and second pieces of user authenticating information have been verified; and
   wherein the user authentication module grants the authorized user access to the portion of the operational features of the IED for a duration of a pre-determined time interval.

2. The IED of claim 1, wherein said IED is selected from the group consisting of an electrical power and/or energy meter, an analyzer of quality of electrical power, an electrical Remote Terminal Unit, an electrical protective relay, an electrical power fault recorder, a Programmable Logic Controller, a water meter, and a gas meter.

3. The IED of claim 1, wherein the biometric sensor is a fingerprint sensor.

4. The IED of claim 1, wherein the biometric sensor is an eye iris sensor.

5. The IED of claim 1, wherein the biometric sensor is an eye retina sensor.

6. The IED of claim 1, wherein the user authentication module further comprises a database of information authenticating authorized users of said IED.

7. The IED of claim 1, wherein the portion of the operational features of the IED includes programming/re-programming of at least one of reset, configuration, billing, communication, data acquisition, and data processing functions of said IED.

8. The IED of claim 1, wherein the second piece of user authenticating information is a password.

9. The IED of claim 1, wherein the user authentication module discriminately enables only the operational features that the authenticated user is granted rights to use.

10. The IED of claim 1, further comprising an image capture module for capturing at least one image at a location of the IED.

11. The IED of claim 10, further comprising a communication module for transmitting the at least one captured image to a location remote from the location of the IED.

12. The IED of claim 11, wherein the at least one captured image is transmitted upon detection of a tamper trigger.

13. The IED of claim 11, wherein the at least one captured image is transmitted upon failure of user authentication.

14. The IED of claim 11, wherein the at least one captured image is transmitted via e-mail.

15. The IED of claim 1, wherein the user authentication module is configured to enable operation of at least one actuator of the user interface module during the pre-determined time interval and disable operation of the at least one actuator of the user interface module when the pre-determined time interval expires.

16. An intelligent electronic device (IED), comprising:
    a metering module configured for measuring or calculating parameters of waveforms of voltages and currents of an electrical power distribution system;
    a processing module configured for processing data obtained using the metering module and administering operational features of the IED;
    a user interface module configured for displaying data and configuration settings of the IED; and
    a user authentication module configured for authenticating an authorized user of the IED and preventing an access by non-authorized personnel to a portion of the operational features of the IED, wherein the user authentication module comprises at least two input devices disposed on a front panel of the IED, each input device configured to acquire a piece of user authenticating information;
    wherein, when the pieces of user authentication information have been verified, the user authentication module grants the authorized user access to the portion of the operational features of the IED for a pre-determined time interval.

17. The IED of claim 16, wherein said IED is selected from the group consisting of an electrical power and/or energy meter, an analyzer of quality of electrical power, an electrical Remote Terminal Unit, an electrical protective relay, an electrical power fault recorder, a Programmable Logic Controller, a water meter, and a gas meter.

18. The IED of claim 16, wherein at least one of the input devices is a magnetic ID card reader.

19. The IED of claim 16, wherein at least one of the input devices is a holographic ID card reader.

20. The IED of claim 16, wherein at least one of the input devices is a RFID card reader.

21. The IED of claim 16, wherein at least one of the input devices is a smart ID card reader.

22. The IED of claim 16, wherein the user authentication module comprises a database of information authenticating authorized users of said IED.

23. The IED of claim 16, wherein the portion of the operational features of the IED includes programming/re-programming of at least one of reset, configuration, billing, communication, data acquisition, and data processing functions of said IED.

24. The IED of claim 16, wherein at least one of the input devices is a keypad or a touch-screen display.

25. The IED of claim 16, wherein the user authentication module discriminately enables only the operational features that the authenticated user is granted rights to use.

26. A method of protecting a portion of operational features of an intelligent electronic device (IED) from access by non-authorized personnel, the method comprising:
- providing the IED for measuring or calculating parameters of waveforms of voltages and currents delivered to at least one load of an electrical power distribution system, the IED including a user authentication module having:
  - a memory device containing a database of information authenticating authorized users of said IED;
  - at least one sensor device disposed on a front panel of the IED, the at least one sensor device including at least one of a biometric sensor and a reader of magnetic, holographic, RFID, or smart ID cards;
  - a keypad or a touch-screen display disposed on the front panel of the IED; and
  - a controller configured for comparing a first piece of user authenticating information acquired using the at least one sensor device with records contained in the database and for comparing a second piece of user authenticating information acquired using the keypad or touch-screen display with records contained in the database;
- requesting a user to provide the first piece of user authenticating information using the at least one sensor device;
- requesting the user to provide the second piece of user authenticating information using the keypad or touch-screen display;
- denying an access to the portion of the operational features of the IED to users whose first and second pieces of user authenticating information do not match the records contained in the database;
- authenticating users whose first and second pieces of user authentication information match the records contained in the database as the authorized users; and
- allowing the authenticated users to access the portion of the operational features of the IED for a duration of a predetermined time interval.

27. The method of claim 26, wherein said IED is selected from the group consisting of an electrical power and/or energy meter, an analyzer of quality of electrical power, an electrical Remote Terminal Unit, an electrical protective relay, an electrical power fault recorder, a Programmable Logic Controller, a water meter, and a gas meter.

28. The method of claim 26, wherein the portion of the operational features of the IED includes programming/reprogramming of at least some of reset, configuration, billing, communication, data acquisition, and data processing functions of said IED.

29. A system for authenticating a user of an intelligent electronic device (IED), comprising:
- at least one intelligent electronic device (IED), each IED comprising:
  - a metering module configured for measuring or calculating parameters of waveforms of voltages and currents of an electrical power distribution system;
  - a processing module configured for processing data obtained using the metering module and administering operational features of the IED;
  - a front panel;
  - a first sensor for acquiring a first piece of authenticating information from at least one user, the first sensor being disposed on the front panel;
  - a second sensor for acquiring a second piece of authenticating information from the at least one user, the second sensor being disposed on the front panel; and
  - a communication module for transmitting the first and second pieces of authenticating information of the at least one user to a remote server; and
- the remote server for enabling access by authorized users and preventing access by non-authorized users to a portion of the operational features of the respective IED by comparing the acquired first and second pieces of authenticating information to records in a database coupled to the remote server.

30. The system of claim 29, wherein at least one of the records of the database includes at least one security level for the user.

31. The system of claim 29, wherein at least one of the first and second pieces of authenticating information includes at least one of information identifying the user, information identifying the IED, and a time and date when a request for access was made.

32. The system of claim 29, wherein the first sensor is a fingerprint sensor.

33. The system of claim 29, wherein the first sensor is an eye iris sensor.

34. The system of claim 29, wherein the first sensor is an eye retina sensor.

35. The system of claim 29, wherein the second sensor comprises a reader of ID cards for acquisition of authenticating information.

36. The system of claim 35, wherein the ID cards are magnetic ID cards.

37. The system of claim 35, wherein the ID cards are holographic ID cards.

38. The system of claim 35, wherein the ID cards are RFID cards.

39. The system of claim 35, wherein the ID cards are smart ID cards.

40. The system of claim 29, wherein the IED further comprises an image capture module for capturing at least one image at a location of the IED.

41. The system of claim 40, wherein the communication module is further configured for transmitting the at least one captured image to the remote server.

42. The system of claim 41, wherein the at least one captured image is transmitted upon detection of a tamper trigger.

43. The system of claim 41, wherein the at least one captured image is transmitted upon failure of user authentication.

44. The system of claim 41, wherein the at least one captured image is transmitted via e-mail.

* * * * *